(12) United States Patent  
Berman

(10) Patent No.: US 7,641,346 B2  
(45) Date of Patent: Jan. 5, 2010

(54) METHOD AND APPARATUS TO INCREASE THE CONTRAST RATIO OF THE IMAGE PRODUCED BY A LCOS BASED LIGHT ENGINE

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 256 days.

(21) Appl. No.: 11/625,722

(22) Filed: Jan. 22, 2007

(65) Prior Publication Data

US 2007/0115441 A1    May 24, 2007

(51) Int. Cl.
  *G03B 21/28* (2006.01)
  *H04N 9/07* (2006.01)
  *G02F 1/00* (2006.01)
  *H04N 5/74* (2006.01)
  *G02F 1/1335* (2006.01)

(52) U.S. Cl. ............ 353/81; 353/33; 348/338; 348/751; 348/758; 349/5; 349/108; 345/698; 345/3.3

(58) Field of Classification Search .......... 353/97, 353/81, 33, 31; 348/337, 338, 751, 758; 349/85, 5, 108; 345/698, 3.3
See application file for complete search history.

(56) References Cited

U.S. PATENT DOCUMENTS

2002/0001135 A1 * 1/2002 Berman et al. ............ 359/640

* cited by examiner

*Primary Examiner*—Diane I Lee
*Assistant Examiner*—Magda Cruz
(74) *Attorney, Agent, or Firm*—Martine Penilla & Gencarella LLP

(57) ABSTRACT

A transmissive LCD is placed in optical series with pixels of an image. The transmissive LCD is set to full transmissivity when bright pixels of the image pass through the transmissive LCD. Transmissivity is decreased where pixels darker than a darkening threshold pass through the transmissive LCD. A darkening curve representative of an amount of darkening performed by the transmissive LCD provides an amount of darkening to be performed on each pixel. Preferably, the darkening curve gradually darkens pixels more as the pixels themselves are darker. The darkening curve may be implemented as a formula or a look-up table in software or drive electronics that energize the transmissive LCD. Both the darkening threshold and the darkening curve may be user selectable.

13 Claims, 7 Drawing Sheets

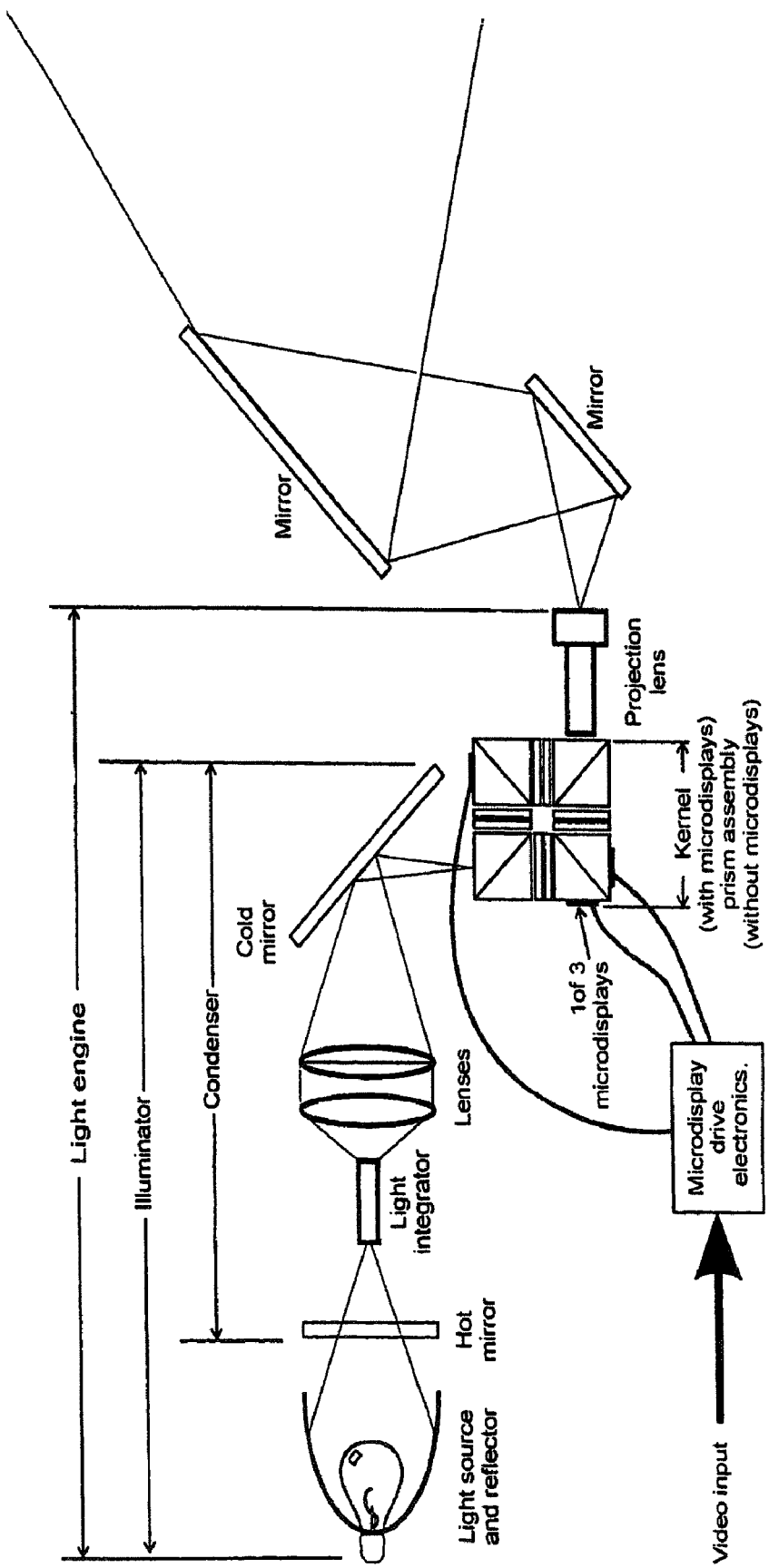
FIGURE #1

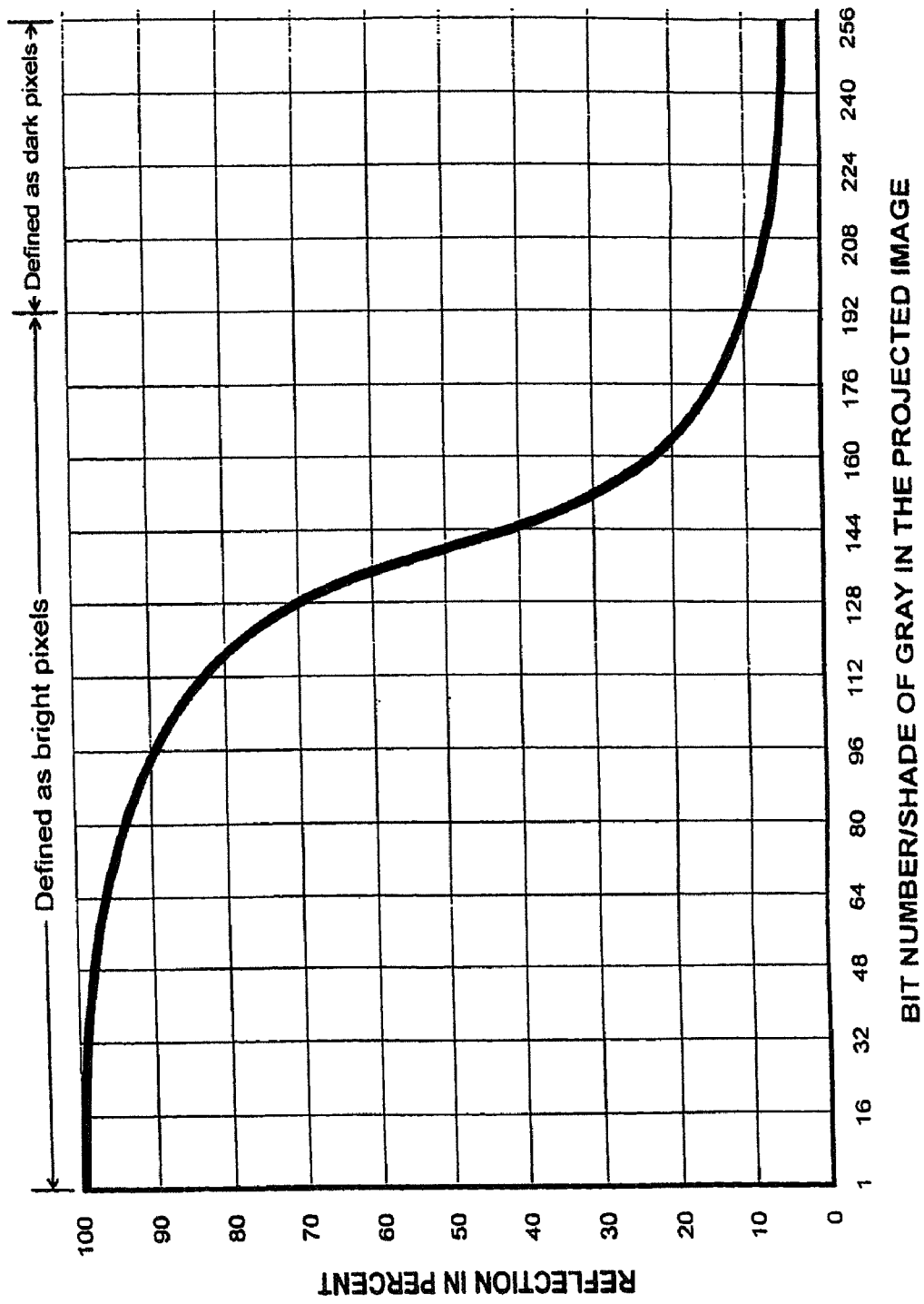
FIGURE #2

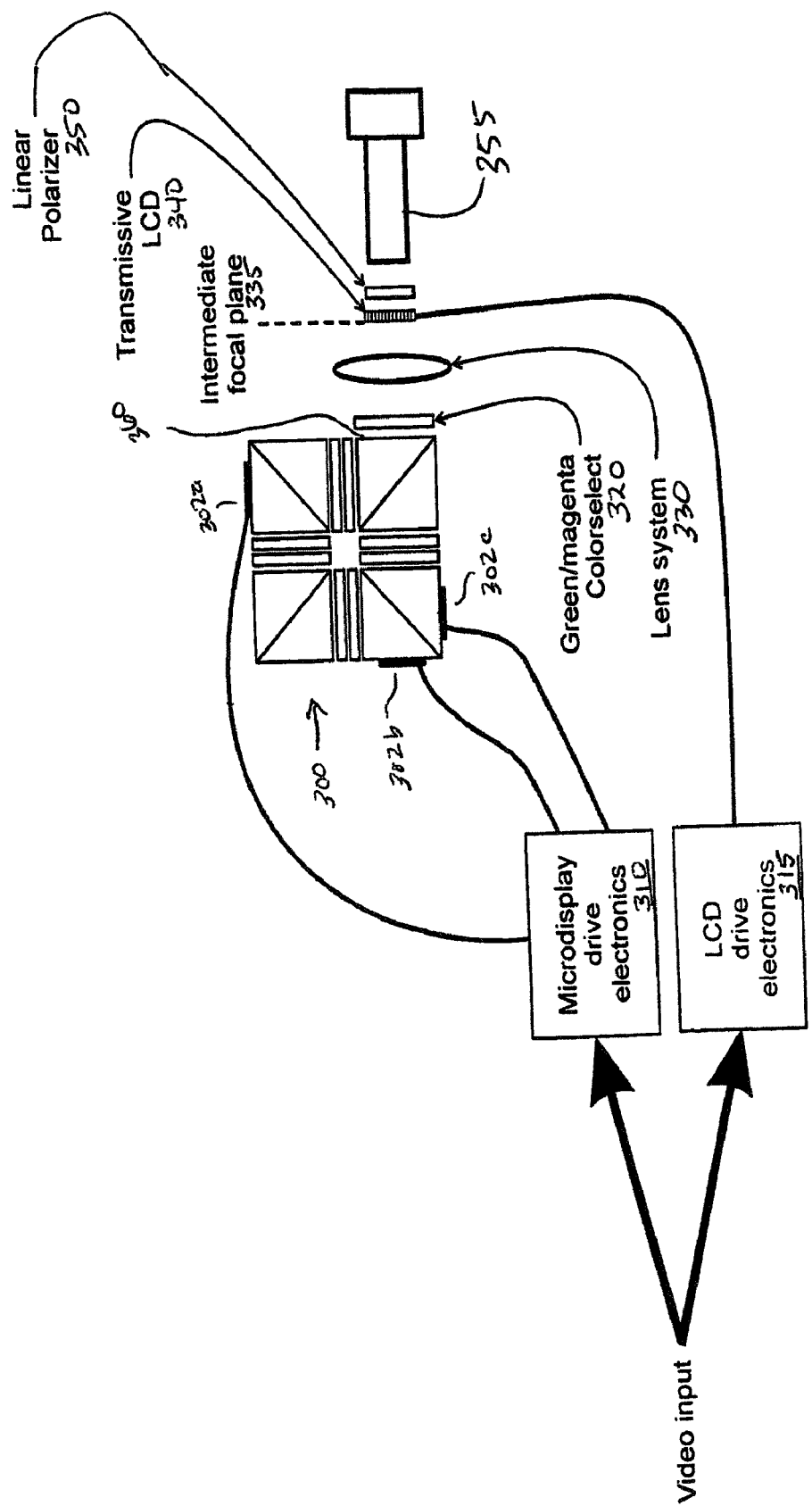
FIGURE #3

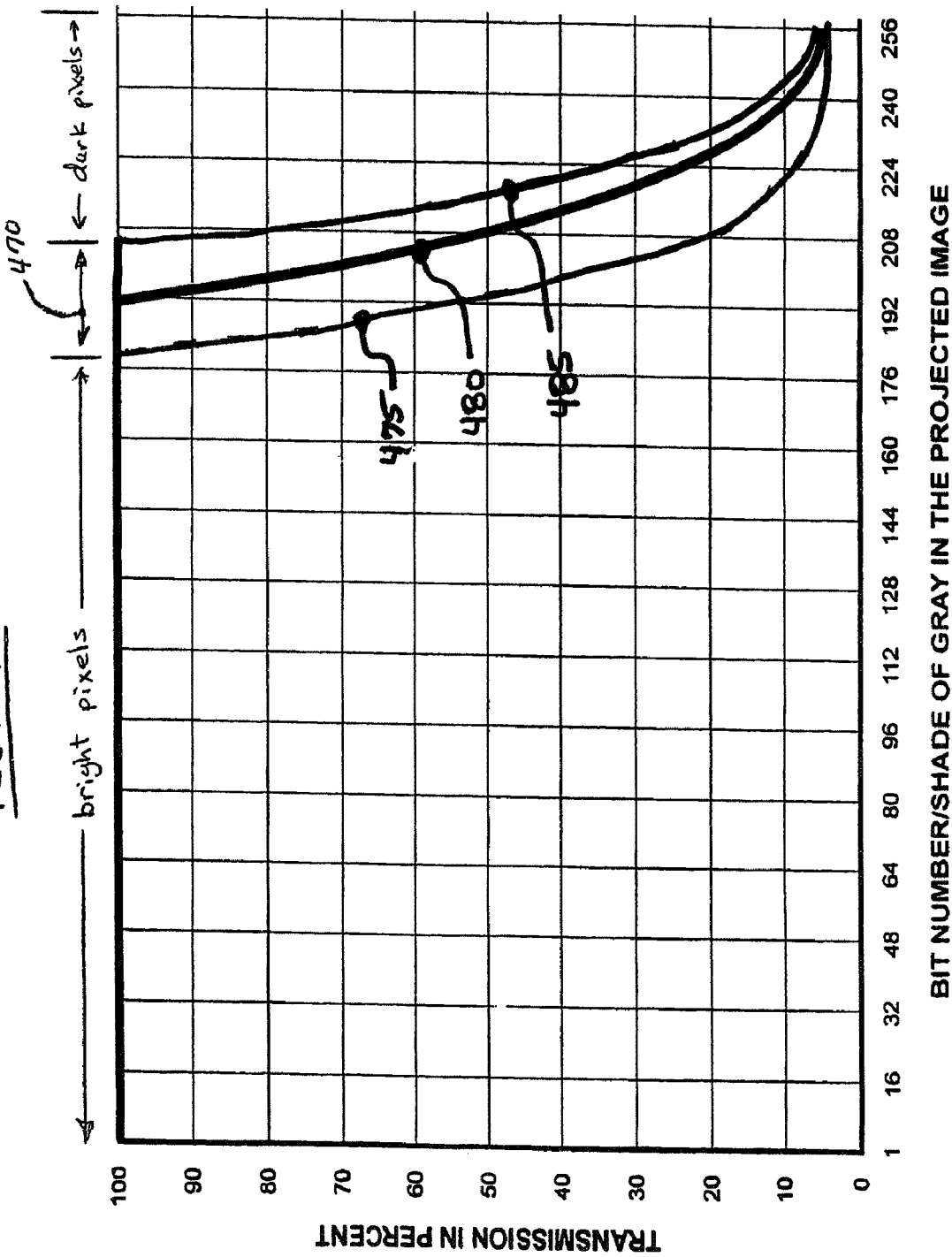

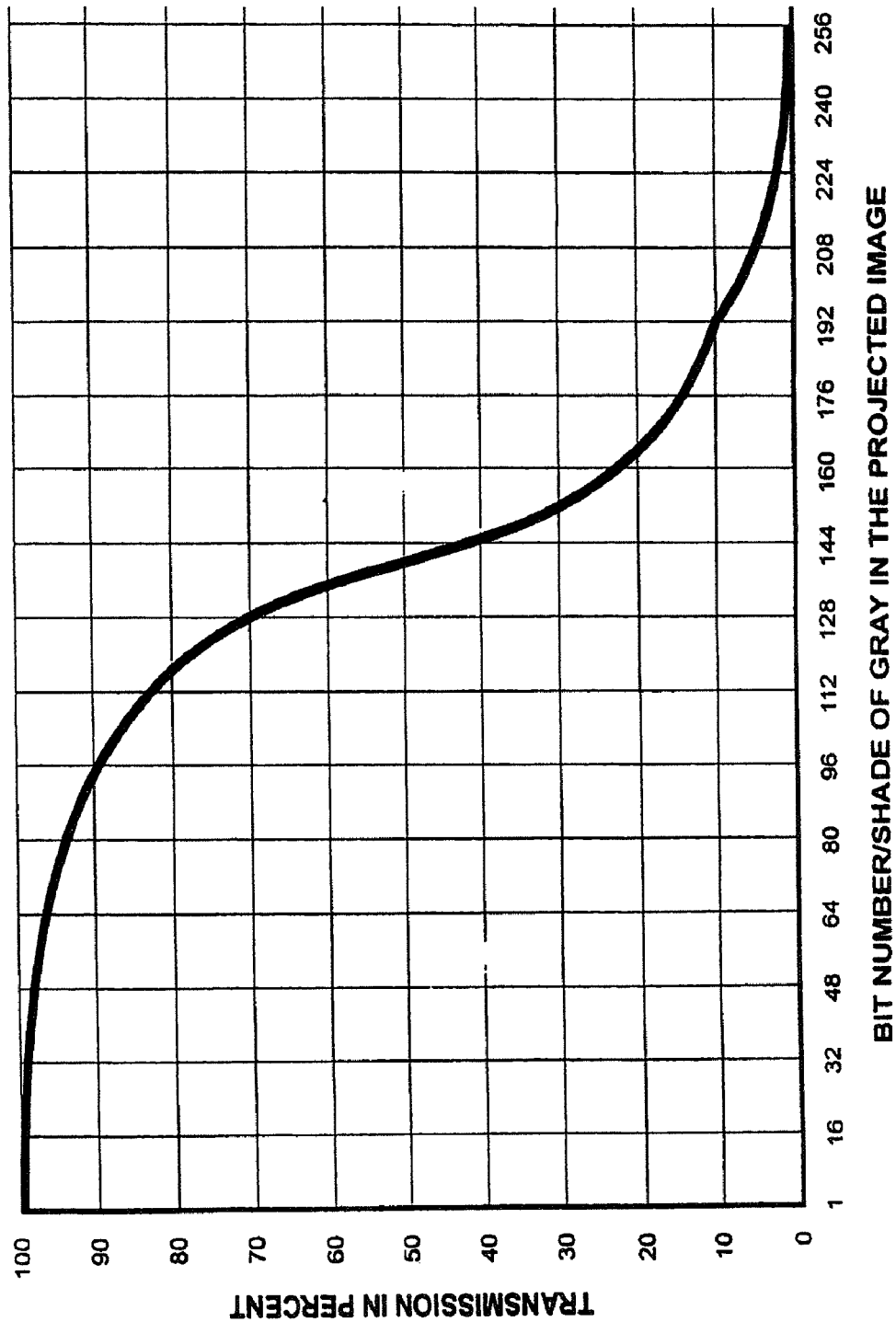
FIGURE #5

METHOD AND APPARATUS TO INCREASE THE CONTRAST RATIO OF THE IMAGE PRODUCED BY A LCOS BASED LIGHT ENGINE

CROSS REFERENCE TO RELATED APPLICATIONS AND CLAIMS OF PRIORITY

This invention claims priority to the following U.S. provisional patent application, which is incorporated herein by reference, in its entirety:

Berman, Provisional Application Ser. No. 60/470,042, entitled "Method And Apparatus To Increase The Contrast Ratio Of The Image Produced By a LCoS Based Light Engine," filed, May 13, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to display systems. The invention is more particularly related to increasing the contrast ratio of display systems. The invention is yet more particularly related to increasing the contrast ratio in projection display systems, including, but not limited to, projections systems using Liquid Crystal on Silicon (LCoS) based light engines.

2. Discussion of Background

When a video display must be physically large and have a high-resolution, a cost effective means to produce the image can be through the use of a projection technology. Amongst the various video projection technologies, the three channel LCoS based approach is a particularly cost effective alternative. A block drawing of the components in a projection television based on conventional LCoS technology is illustrated in FIG. 1.

A challenge faced by all display technologies is to produce an image with a high contrast ratio. There are many approaches to increasing the contrast ratio of the image produced by a LCoS based video projection system. Nonetheless, the current state of the art in LCoS projection is such that further improvement in contrast ratio is desired in even the most advanced systems.

The primary background information necessary to understanding the invention disclosed in this document relates to a display's "gamma curve". One version of this concept is explained with reference to FIG. 2. This graph charts the relationship between the percentage of incident light that is reflected from a given pixel in a LCoS microdisplay and the shade of gray or bit number assigned to that level of reflectivity. Consider some details of the relationship:

- A fully bright pixel corresponds to a shade of gray assigned number 1.
- A fully dark (black) pixel corresponds to the shade of gray assigned number 256.
- The relationship between the shades of gray assigned numbers between 1 and 256 and the reflectivity of the pixel is not linear. The relationship is called a gamma curve.
- Even at the highest bit numbers (the darkest shades of gray), the reflectivity of the pixel is not zero and therefore not completely black.

This last point is particularly significant because Contrast Ratio=(Reflection in the full bright state)/(Reflection in the full dark state) and even a small residual reflectivity in the dark state results in a dramatic reduction in the contrast ratio. FIG. 2 also defines shades of gray having a bit value below 192 as being "bright" pixels and those having a value above 192 as being "dark" pixels, however, this definition is arbitrary but reasonable and will be utilized in the detailed description of the invention below.

SUMMARY OF THE INVENTION

The present invention improves the contrast ratio of a video image projected by an LCoS based light engine. In one embodiment, the improvement is accomplished by a modification to the conventional light engine that serves to reduce the transmission of only those pixels in the image that are desired to be blacker. In one embodiment, a transmissive liquid crystal display located at an intermediate focal plane included in the optical path within the light engine and aligned on a pixel-by-pixel basis with the image produced by the LCoS microdisplays. The function of the transmissive LCD is to further modulate and increase the blackness of only those pixels in the image that are intended to be dark.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an illustration of a configuration of a conventional LCoS based rear screen video projection system according to an embodiment of the present invention;

FIG. 2 is an illustration of a gamma curve for LCoS pixels according to an embodiment of the present invention;

FIG. 3 is an illustration of key components in the high contrast ratio LCoS based light engine for video projection according to an embodiment of the present invention;

FIG. 4B is an illustration of a gamma curve set for any of a variable range of darkening thresholds according to an embodiment of the present invention;

FIG. 5 is an illustration of a gamma curve for pixels in the image of the high contrast ratio light engine according to an embodiment of the present invention.

DESCRIPTION OF THE PREFERRED EMBODIMENTS

Figure 4A:
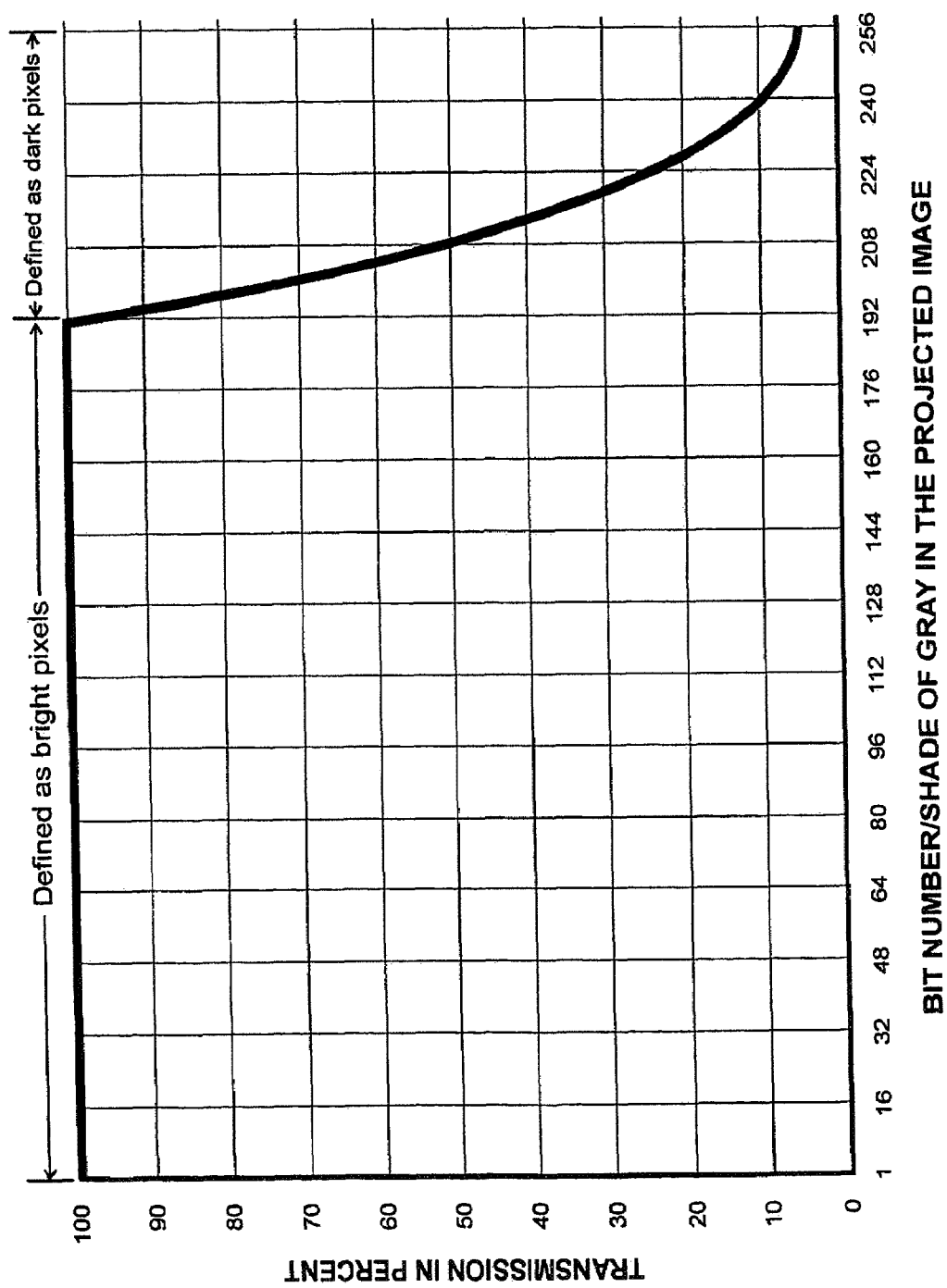
FIG. 4A is an illustration of a gamma curve for LCD pixels according to an embodiment of the present invention.

FIG. 3 is a block drawing that illustrates the main components of an embodiment of the present invention. Together, the components increase the contrast ratio of a video image produced by a LCoS based light engine utilizing the invention.

A kernel 300 separates input light into individual light beams. Each light beam follows a path (light channel) through the kernel, and is modulated. The modulation of each light beam is performed, for example, by reflection off a corresponding LCoS microdisplay. In this example, the red light beam is modulated by reflection off a "red" microdisplay, the blue light beam is modulated by reflection off a "blue" microdisplay, and so forth. In one embodiment, the microdisplays themselves are virtually identical, but they are "energized" with image content corresponding to the color light beam reflected.

"Energization" of the microdisplay is performed, for example, by drive electronics 310 which is an electronic device that takes a video signal as input and creates individual color content portions of the video input signal. Each color content portion of the video input signal is individually directed toward the correspondingly colored microdisplay. In this way, the red portion of the video input is directed toward the "red" microdisplay, the blue portion of the video input is directed toward the blue microdisplay, and so forth.

The example kernel in FIG. 3 is a three channel kernel (red, green, and blue light channels). However, after review of the present disclosure, it will be apparent to the ordinarily skilled artisan that the present invention may be applied to wide variety of kernel designs and configurations having any number of light channels.

Turning now to special features of the present invention, a Green/Magenta ColorSelect material 320 is included at an output of the kernel 300. The purpose of the Green/Magenta Color Select material 320 is to rotate the axes of linear polarization of the red, green and blue lights in the projected image to the same orientation. This component may not be necessary in all cases, and, optical devices other than the Green/Magenta ColorSelect material 320 that also provide an appropriate rotation of linear polarization(s) may also be utilized.

A lens system 330 focuses light exiting the kernel to an intermediate focal plane 335. Thus, a full color image (still image or video image) modulated into the red, green, and blue light beams is focused at the intermediate focal plane 335.

A transmissive LCD 340 is located at the intermediate focal plane 335. A pixel array 345 (not shown) within the transmissive LCD 340 preferably has at least as many rows and columns as that in the modulation devices (e.g., microdisplays) of the kernel 300. The pixel array 345 or a portion of the pixel array 345 in the transmissive LCD corresponds to a pixel array 305 (not shown) of the microdisplays 302a, 302b, and 302c, and the image projected from the kernel 300. The pixel array 305 is, for example, a LCoS array.

The pixel array 345 of the transmissive LCD 340 preferably has the same physical size as the image projected from the kernel 300 at the intermediate focal plane 335. The pixels in the pixel array 345 (transmissive LCD array) are accurately aligned with corresponding pixels in the projected image (LCoS array) at the focal plane 335. That is, for example, each pixel in the transmissive LCD array is accurately in optical series with the corresponding pixel in the LCoS array. Alternatively, each pixel in the LCoS array corresponds to a set of pixels in the transmissive LCD array.

In the example embodiment of FIG. 3, a linear polarizer 350 is placed after the transmissive LCD. The linear polarizer 350 is preferably absorptive but can be reflective. A projection lens 355 is used to expand and focus the image onto a screen or other display surface.

LCD Drive electronics 315 utilize the video input signal to produce a drive signal for the transmissive LCD 340. The LCD drive electronics 315, for example, provide a signal to the pixel array 345 that darken pixels in the image at the intermediate focal plane 335 that correspond to dark or black pixels in the video input signal.

FIG. 4A illustrates one embodiment of a gamma curve of the transmissive LCD 340 as may be implemented by LCD drive electronics 315. Those pixels in the transmissive LCD array that correspond to pixels in the image with a bit value less than 192 (the bright pixels) are driven to the full transparent state. In this way, the brightness of the corresponding LCoS array pixels (image pixels) are not reduced, they remain fully bright. Also as indicated by the gamma curve, those pixels defined as dark (having a bit number greater than 192, or beyond a "darkening" threshold) are driven such that their transmission is reduced. The higher the bit number the lower the transmission of the LCD. Selection of a darkening threshold is illustrated as a 192 bit number, but the darkening threshold is preferably selected by taking into account performance of a system to which the present invention is applied.

In one embodiment, the darkening threshold is adjustable. In one embodiment, the present invention is implemented in a projection television and has a user adjustable darkening threshold. An adjustment for the darkening threshold is maintained in a set-up menu of the projection television. A darkening threshold sliding scale, for example, is provided by a program of the set-up menu. The set-up menu program is configured to accept, for example volume up and volume down commands to move the sliding scale up or down. The sliding scale represents, for example, a series of steps around a darkening threshold of 192 (or other mid-range threshold value). The user may select, for example, a darkening threshold bit value of between 182 and 202. The user-selected darkening threshold is then provided to the LCD drive electronics to implement a modified gamma curve according to the present invention.

FIG. 4B illustrates one possible set of modified gamma curves. Curve 475 represents a gamma curve having a low darkening threshold, curve 480 represents a gamma curve having a mid range darkening threshold, and curve 485 represents a gamma curve having a high darkening threshold value.

Range 470 exemplifies a range of darkening thresholds that may be selected by a user. The user selected darkening threshold is used to determine a modified gamma curve which illustrates an amount of darkening imposed by the transmissive LCD for pixels at or darker than the darkening threshold. In one embodiment, the modified gamma curve is implemented, for example by applying a polynomial or other curve fitting operation to determine values of the curve. Amounts of energization of the transmissive LCD needed to implement the various darkening levels illustrated in the modified gamma curve are, for example, stored in the look-up table along with corresponding bit values that index the table. In another embodiment, selected energization values in a lookup table of a standardized or middle range gamma curve are moved up or down depending on user input. For example, if the user selects a darker darkening threshold, then energization values for each bit number/gray shade in the image are shifted down (less transmission percent). If the look-up table indexes each bit value, then, for example, the energization level for a 195 bit number pixel is shifted to the standardized energization level for a 196 or higher bit number pixel.

In one embodiment, the LCD drive electronics 315 include hardware and/or software that converts the video input to a black and white image. A level of brightness is established for each pixel in the black and white image which is then utilized as an index into a gamma curve lookup table or in a calculation to produce a drive signal that is applied to the transmissive LCD 340. The drive signal implements, for example, the gamma curve in FIG. 4A on the transmissive LCD.

Thus, the gamma curve is implemented, for example, via a calculation or a lookup table that correlates pixel brightness to the drive signal. FIG. 4A is an example gamma curve and any other gamma curves with the same or different dark/light break points (e.g., 192 in FIG. 4A) may be implemented. In another embodiment, the shape of the gamma curve (e.g., curve 475) may be adjusted by allowing the user to adjust constants or multiples of an equation implementing the gamma curve. Adjustments may include, for example, increasing or decreasing the slope of a midpoint of the gamma curve and/or increasing or decreasing a rate of change at either the darkening threshold or at the darkest of the pixels on the curve. Alternatively, a user may select an entirely different equation to implement the gamma curve (e.g., select from a predetermined set of gamma curve equations in a set-up menu). The selected equation is then used, for example, to determine the amount of transmissivity for each pixel number greater than the darkening threshold and populate the look-up table accordingly.

In addition, it should be noted that other types of lighting systems may need to adjust light of certain portions of images or other light projections. Other lighting systems may implement portions of the invention by inserting a transmissive LCD in a light path of the other lighting system and configuring a device that recognizes portions of the image/projection that are to be adjusted (or left unaltered) and provide a drive signal indicating the amount of adjustment to the transmissive LCD.

The net effect of the combination of placing the LCD in optical series with the microdisplay and driving the LCD in this manner is illustrated in FIG. 5. The bright pixels in the image are not reduced in brightness but the dark pixels are made much blacker. The result is that the contrast ratio of the image is greatly improved.

Figure 6:
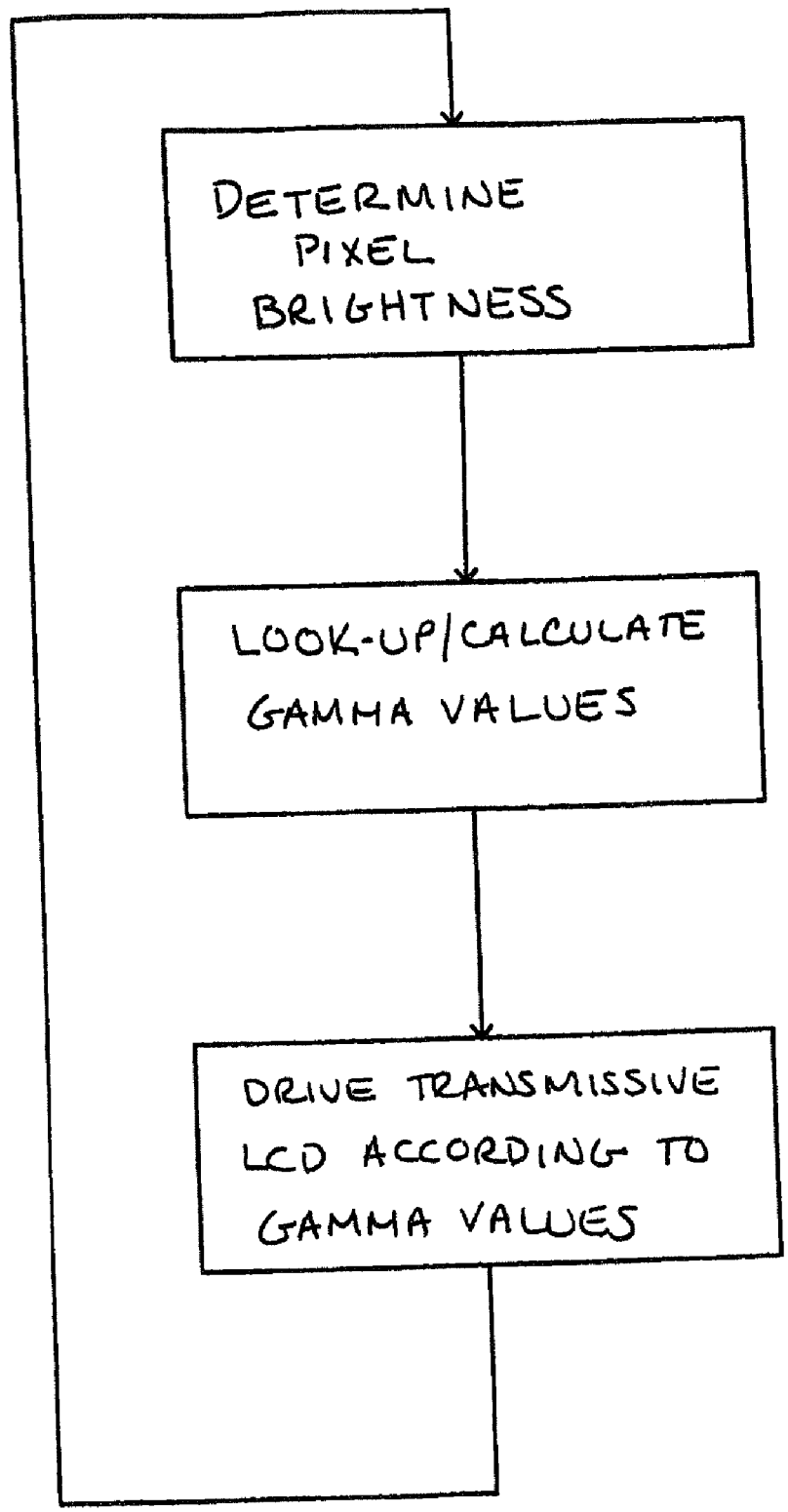
FIG. 6 is a flowchart illustrating a process of adjusting pixel brightness according to an embodiment of the present invention.

FIG. 6 is a flowchart illustrating a process of adjusting pixel brightness according to an embodiment of the present invention. The pixel brightness of the incoming image is determined. The look-up/calculation of Gamma values may be a direct look-up/calculation of gamma values (or other related value), or a direct look-up/calculation of drive signal values corresponding to the intended gamma value based on the pixel brightness of the incoming image. And, the transmissive LCD is driven according to the gamma values (e.g., by producing a drive signal corresponding to the looked-up/calculated value, or, as another example, by implementing the looked up drive signal values). The determination of pixel brightness, and calculations and/or lookups performed to produce a drive signal are performed, for example, by electronics and/or software embedded in the LCD drive electronics illustrated in FIG. 3.

There are several practical considerations related to the implementation of the LCD. For example, since the LCD is likely to be a commercially available TFT display, the aperture ratio will decrease as the display becomes smaller. A consequence of this effect is that there will be less and less light transmitted through the LCD as the display becomes smaller and smaller. Based on this consideration, it is desirable to use a larger display.

A larger LCD allows the linear polarizer to also be larger. This reduces the light flux through the polarizer and permits the use of a inexpensive, absorptive linear polarizer material. And, given an array size, the larger the LCD, the larger the pixels. It will be easier to align large pixels in the LCD to correspondingly large pixels in the projected image of the LCoS microdisplay.

There are, however, some negative aspects to using a larger LCD. The light engine will become physically less compact and the optics will be larger and likely more expensive. Obviously, the detailed design of a light engine utilizing the disclosed invention is a compromise between the various positive and negative factors. Component sizes may also be dictated by other design considerations (e.g., size of a finished product, cost/availability of different component sizes, etc.).

Referring back to FIG. 3, the example kernel 300 comprises a prism assembly and the 3 microdisplays 302a, 302b, and 302c. The prism assembly itself is, for example, composed of 4 main optical components (beamsplitters). Each beamsplitter comprises 2 prisms abutted at their diagonals and a beamsplitting layer disposed between the diagonals. The exterior shape of the prism assembly is a cube.

In one embodiment, an image projector according to the present invention includes a prism assembly in which the main optical components of the prism assembly (beam splitters) are liquid coupled. The beam splitters are set, for example, in prism assembly pathlength matched positions with joints between the beamsplitters. The joints are filled with liquid (e.g., an index matching fluid). A frame and/or a mounting plate in conjunction with an adhesive or other seal maintains the fluid within the prism assembly. Optical flats such as Color Selects (e.g., a product by ColorLink Corporation), dichroics, wavelength specific retarders, if needed for the prism assembly design, may also be inserted into the joints and immersed in the index matching fluid. The beam splitters each comprise 2 prisms abutted on their diagonals and set in beamsplitter pathlength matched positions. A beam splitting layer is disposed on one or both of the diagonals. The beam splitting layer may be any of, for example, a polarizing beam splitting thin film (a PBS beamsplitter), a single color cholesteric layer, two cholesteric layers of different colors (Cholesteric based Beam Splitters—CBSs), a dichroic layer, or any other material that can perform beam splitting.

Pathlength matched prism assemblies may be described, for example, as prism assemblies where light pathlengths between faces of the beam splitting components having microdisplays mounted thereon and a reference plane are equivalent. For example, pathlength distances from any of the microdisplays 302a, 302b, or 302c, to a reference plane (such as exit face 360, or intermediate focal plane 335) are equivalent. Thus, individual light beams in each of the separately colored light beams corresponding to a same image pixel once reflected off the microdisplays arrive at the reference plane after traveling the same distance. And, since the pathlengths within the prism are matched (a pathlength matched prism assembly), distances traveled within the prism by the light beams reflected from the microdisplays are also the same.

The prism components themselves are not precise enough, particularly in mass quantity production, to affirmatively bond the prism components directly together and end up with matched pathlengths in the prism. However, Berman et al., U.S. patent application Ser. No. 10/202,595, filed Jul. 24, 2002, entitled "Method and Apparatus for Configuration and Assembly of a Video Projection Light Management System", the contents of which are incorporated herein by reference in their entirety, describes construction of a pathlength matched prism assembly in which standard mass produced optical components may be arranged in pathlength matched positions (e.g., fixed to a plate or frame, and then spaces between the components are filled with an optical coupling fluid such as mineral oil or other commercially available index matching fluid). All of the devices and construction techniques described in the above referenced patent application may be applied to construction of prism assemblies with cholesteric based beam splitting devices.

In addition, individual beam splitting components of the prism assembly may themselves be constructed as pathlength matched beamsplitters. Construction techniques for pathlength matched beamsplitters are described in Detro, U.S. patent application Ser. No. 10/251,225, filed Sep. 20, 2002, entitled "Pathlength Matched Beam Splitter and Method and Apparatus for Assembly", the contents of which are incorporated herein by reference in their entirety. The techniques taught and devices described in the above referenced patent application are also applicable to the construction of a cholesteric based pathlength matched beam splitting device, and one or more of the beamsplitters in a prism assembly or kernel may be a( ) cholesteric based beamsplitter(s). Several embodiments of cholesteric based beam splitters are described in Berman, U.S. patent application Ser. No. 10/646, 291 entitled "Prism Assembly With Cholesteric Reflectors" filed Aug. 22, 2003, and Berman and Detro, U.S. patent application Ser. No. 10/816,996 entitled "Advanced Prism Assemblies and Prism Assemblies With Cholesteric Reflectors" filed Apr. 2, 2004. Projectors built using any of the kernel designs described above, variations of the kernel designs described above, and/or kernel designs in any of the referenced patent applications may be fitted with a transmissive LCD as described herein.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identification of pixel darknesses (e.g., gray levels), determining an amount of transmissivity for any particular pixel (e.g., table look-up or formula calculation to determine transmissivity), retrieving user inputs, and energizing a transmissive LCD to restrict transmissivity according to calculated/look-up values.

The present invention may suitably comprise, consist of, or consist essentially of, any of element or component of the present invention and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An image projector, comprising:
   a kernel configured to modulate at least one light beam with an image;
   a transmissive LCD type device positioned in a light path of the image projector; and
   a drive electronics configured to darken pixels of the transmissive LCD device based on a gray shade of the image, wherein the transmissive LCD is configured to darken dark pixels of the image by restricting transmissivity of the dark pixels.

2. The image projector according to claim 1, wherein the transmissive LCD is positioned in an intermediate focal plane of the image projector.

3. The image projector according to claim 1, further comprising a projection lens configured to focus the image transmitted through the transmissive LCD onto a viewing screen.

4. The image projector according to claim 1, wherein the kernel is a liquid coupled quad style pathlength matched kernel.

5. The image projector according to claim 1, wherein the kernel includes a liquid crystal on silicon microdisplay and the transmissive LCD includes a pixel array having pixels that correspond one-to-one correspondence to corresponding pixels in the liquid crystal on silicon microdisplay.

6. The image projector according to claim 5, wherein the transmissive LCD is larger than the liquid crystal on silicon microdisplay.

7. The image projector according to claim 1, wherein an amount of transmissivity restriction imposed on each dark pixel is based a degree of an intended black state of the dark pixels.

8. The image projector according to claim 1, wherein all dark pixels darker than a darkening threshold are darkened by the transmissive LCD.

9. The image projector according to claim 8, wherein all pixels brighter than the darkening threshold are unaltered by the transmissive LCD.

10. The image projector according to claim 1, wherein the drive electronics are further configured to darken pixels darker than a predetermined darkening cut-off value.

11. The image projector according to claim 10, wherein the darkening cut-off value is a user settable value.

12. The image projector according to claim 10, wherein the predetermined darkening threshold is a 192 bit value.

13. The image projector according to claim 1, wherein the drive electronics include a look up table including a plurality of darkening intensity values indexed by a corresponding plurality of brightness values.

* * * * *